United States Patent [19]

Aubrey et al.

[11] Patent Number: 5,728,477

[45] Date of Patent: Mar. 17, 1998

[54] LAMINATED BATHTUB WALL AND METHOD OF MANUFACTURING A LAMINATED BATHTUB WALL

[76] Inventors: Michael Leo Joseph Aubrey, 20 Spring Garden Avenue, Nepean, Ontario, Canada, K2G 3B3; John Gerard Manzo, 1445 Fisher Avenue, Ottawa, Ontario, Canada, K2C 1X3

[21] Appl. No.: 444,745

[22] Filed: May 19, 1995

[51] Int. Cl.$^6$ ........................ B32B 27/42
[52] U.S. Cl. ............ 428/524; 428/525; 428/526; 428/530
[58] Field of Search .............. 428/524, 525, 428/526, 530

[56] References Cited

U.S. PATENT DOCUMENTS

| | | | |
|---|---|---|---|
| 3,420,021 | 1/1969 | Anghinetti et al. | 52/264 |
| 4,052,835 | 10/1977 | Stratis | 53/21 |
| 4,067,071 | 1/1978 | Altman et al. | 4/145 |
| 4,157,756 | 6/1979 | Stratis | 206/223 |
| 4,311,757 | 1/1982 | Raghava et al. | 428/323 |
| 5,229,217 | 7/1993 | Holzer | 428/503 |

*Primary Examiner*—Edward J. Cain

[57] ABSTRACT

A unitary laminated bathtub wall covering having a back panel and at least one side panel comprises a formable core, such as phenolic resin impregnated layers of kraft paper, laminated between front and back layers of finishing resin such as melamine. The laminated bathtub wall has a reduced co-efficient of expansion the nature of which is linear to reduce buckling and delamination. A bathtub wall covering may be custom cut and shaped, i.e. post-formed, according to the method described from precise measurements of the bathtub enclosure area for easy installation with a single, mastic type adhesive.

16 Claims, 1 Drawing Sheet

LAMINATED BATHTUB WALL AND METHOD OF MANUFACTURING A LAMINATED BATHTUB WALL

BACKGROUND OF INVENTION

This invention relates to bathtub wall coverings for bathtub enclosures. More particularly, this invention relates to unitary, high pressure plastic laminated bathtub walls and a method of manufacturing such laminated bathtub walls.

Bathtub enclosures, typically comprising the back and opposing side walls above a bathtub, require covering to protect them from water damage. At first, laminated bathtub wall coverings produced in Canada were standard size units bonded to ¾" plywood shells for installation into the rough framing above a bathtub. The laminate material comprised a backing layer and a decorative outer layer of melamine. Also, the shells could not be custom fitted for existing bathroom enclosures for renovation construction.

Thereafter, it became known in the art to produce custom made, post-formed units. The units are formed of laminate materials composed of phenolic substrate layers bonded typically with an outer layer of melamine. The units must be site-fitted and installed ideally using dual adhesive systems, namely fast setting contact cement adhesives with slow setting mastic adhesives.

Bathtub wall coverings of this type are presently constructed as follows. Two measurements are taken of the width of the back wall in the enclosure area above the bathtub to be fitted. The width of the bottom of the wall just adjacent the top of the bathtub is measured as well as the width at the top of the wall typically at a point 60 inches (1600 mm) above the bathtub.

From these two simple measurements, a laminated bathtub wall covering is post-formed from a single flat sheet of one sided laminate by bending the laminate to form a back and two opposing side walls. The partially completed unit is then ready for on-site trimming and installation.

Once on-site, the covering is set into the enclosure area so that further measurements can be taken to fit the covering tight to the top of the bathtub, to trim the side walls to their respective widths and to insert apertures for taps and other fixtures. Once measured, the covering is manually cut and trimmed using hand or power operated tools. After the covering is properly sized, an edge moulding is fitted around its perimeter except for the bottom which is, when installed, adjacent the top of the bathtub. The covering is then bonded to the wall surface using an adhesive system comprising a combination of contact adhesives and mastic type adhesives. This system employs a fast setting contact cement for strong bonding to resist irregular flexing of the one sided laminate. The slow setting mastic is used to allow positioning of the bathtub wall before hard pressing the wall against the contact cement. As such, the contact cement must be applied flatter to the mounting wall than the mastic so as to achieve the two stage adhesion. The covering is generally pinch rolled to ensure proper bonding. Once bonded, the covering is sealed to the top of the bathtub with a mildew resistant caulking compound.

The installation requires the talents of a highly trained and skilled technician. Laminates of this type may crack easily when cut. Further, the laminates exhibit non-linear expansion and contraction which may result in delamination and buckling when subjected to temperature and humidity extremes typical of bathrooms. This is particularly true when the covering is installed tight to the tub, trim or fixture.

As a result, the coverings require an adhesive system which will provide 100% elastic coverage such as the dual adhesive system just described. However, this adhesive system must be applied meticulously to ensure proper results. An imperfect bathtub enclosure area having bumps or hollows in the walls greatly complicates installation. If only a single adhesive such as contact cement is used, great care must be taken in the initial placement of the covering as the adhesive will not allow the covering to be repositioned once contact is made. Due to the size and shape of most coverings, perfect, first time placement is rarely possible.

Thus, bathtub wall installations of this type require a high degree of supervision by trained personnel and are beyond the scope of nearly all do-it-yourself installers.

Many other types of bathtub wall materials are known in the art. U.S. Pat. No. 4,067,071 discloses a proposed solution to warpage of thermoplastic bathtub wall panels due to thermal expansion. The patent discloses a fibre reinforced polyester laminated backing layer to the rear surface of thermoplastic bathtub wall panels.

U.S. Pat. No. 3,420,021 describes separate panels for a bathtub wall covering installation in which each panel is of a layered or sandwich construction. The sandwich is comprised of thermoset resin laminates on either side of a central core of light material unaffected by moisture, such as polystyrene foam. The laminates are decorative and may be made of fibrous sheet material impregnated with phenolic resin core sheets and melamine resin surface sheets which are then thermoset in a heat and pressure consolidation step.

U.S. Pat. Nos. 4,052,835 and 4,157,756 are closely related. Each of these discloses a one sided FORMICA (i.e. melamine) laminate sheet bathtub wall covering which is pre-formed for installation. Further, the latter patent also discloses a sheet of plastic laminate, preferably general purpose grade ⅟₁₆" thick, having a decorative layer on one side and a different backing layer on the opposite side.

However, none of these patents discloses a simple solution to the buckling and delamination associated with melamine coated single sheet panels for custom fit post-formed bathtub wall coverings.

SUMMARY OF INVENTION

It is an object of the present invention to provide an improved laminated bathtub wall and method of manufacturing a laminated bathtub wall.

According to a first aspect of the present invention, a consolidated high pressure plastic laminate material for forming a laminated bathtub wall comprises a formable core laminated between front and back layers of finishing resin. The formable core may comprise a plurality of phenolic resin impregnated layers of kraft paper. The finishing resin layers may comprise melamine.

According to a second aspect of the invention, a unitary laminated bathtub wall comprises a formable core laminated between front and back layers of finishing resin wherein the wall comprises a back panel and at least one side panel.

According to another aspect of the invention, a method of manufacturing a laminated bathtub wall from a high pressure plastic laminate for installation in a bathtub enclosure area comprises the steps of measuring the bathtub enclosure area to create precise bathtub wall measurements; cutting the laminate, which comprises a formable core laminated between layers of finishing resin, according to the measurements; and shaping the laminate according to the measurements to conform the laminated bathtub wall to the bathtub enclosure area. The cutting and shaping steps are conducted off-site from the bathtub enclosure area.

The present invention has the advantage that bathtub wall coverings formed from the laminated material exhibit reduced expansion and contraction characteristics the nature of which are linear when subjected to temperature and humidity extremes. As a result, buckling and delamination problems are reduced or eliminated.

Further, bathtub wall coverings may be custom fit to a bathtub enclosure area accurately, with reduced installation supervision and with reduced risk of damage to the covering during installation. Such walls may be easily installed by a do-it-yourself type installer.

BRIEF DESCRIPTION OF FIGURES

The invention itself, together with further objects and attendant advantages, will best be understood by reference to the following detailed description viewed in conjunction with the accompanying drawing, in which.

DETAILED DESCRIPTION OF THE PRESENTLY PREFERRED EMBODIMENTS

Figure 1:
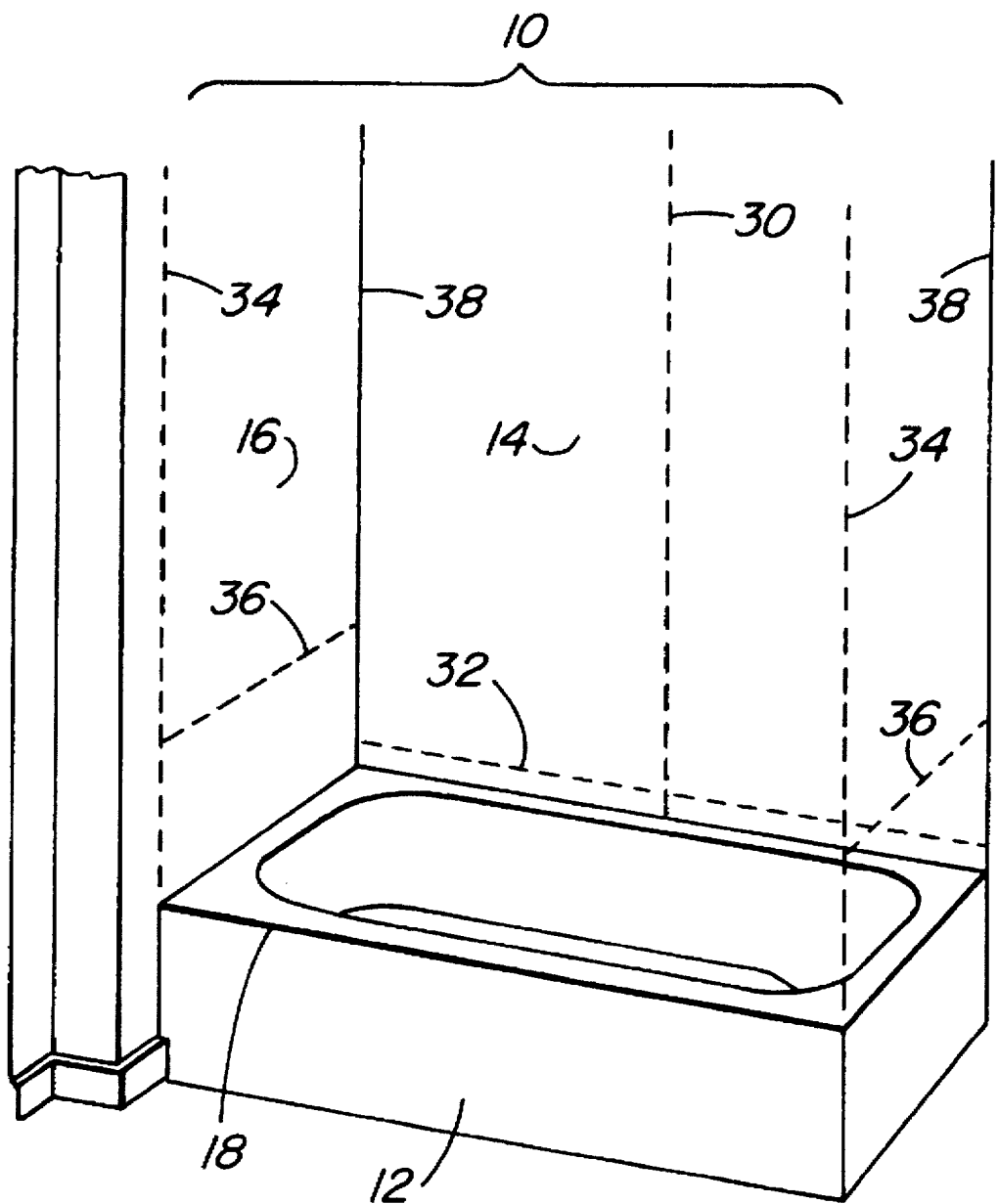
FIG. 1 is a perspective view of a bathtub enclosure area in which measuring guide lines are shown in dash lines and the right side wall of the area is cut away.

The construction of high pressure plastic laminates is well known in the art. However, compared to known laminates (which typically comprise a phenolic resin backing layer laminated with a finishing resin outer layer such as melamine) the material of the present invention is composed of a formable core such as phenolic resin impregnated layers of kraft paper—by way of example, 4 or 5 layers—laminated with front and back layers of finishing resin such as melamine. It is understood that the front and back layers need not appear the same visually. The total thickness of the laminate material is in the range of 0.025–0.1 inches, in which each finishing resin layer is in the range of 0.005–0.020 inches in thickness. Preferably, total laminate thickness is in the range of 0.040–0.060 inches.

A laminate of such construction is stiffer than high pressure plastic laminates heretofore applied to bathtub enclosures. Moreover, laminates of the present invention not only exhibit reduced expansion and contraction tendencies when subjected to temperature changes, but the expansion and contraction is linear when compared to previously used laminates.

Laminates of the present invention may be cut and shaped to produce unitary bathtub walls comprising a back panel and one or more side panels more particularly described below.

Referring now to FIG. 1, a typical bathtub enclosure area 10 to be fitted with a laminated bathtub wall covering (not shown) is illustrated. The bathtub enclosure area 10 above a bathtub 12 comprises a back wall 14 and opposing side walls 16 (right side wall 16 being cut away for purposes of clarity). However, as is known in the art, other bathtub enclosure configurations are possible and contemplated by the present invention. For example, the enclosure area may have only one side wall.

Dashed lines 30–36 illustrate measuring guide lines well known to enclosure fitters in the art. Line 30 depicts a plumb line, typically 60 inches (1600 mm) in height, which is used to determine the width of the back wall and the vertical deviations of the corners 38 of the enclosure area 10. Side plumb lines 34 are also 60 inch (1600 mm) plumb lines which determine the outer edges of the opposite side walls of the bathtub wall. Side plumb lines 34 are typically drawn vertically from the edge 18 of the bathtub 12. However, side walls which extend beyond the edge of the bathtub are possible and well known to those in the art. Side square lines 36 are used as reference lines to determine the slope of the ends of the bathtub. Similarly back wall square line 32 is used to determine the slope of the back of the bathtub 12.

In order to construct a laminated bathtub wall covering of the present invention, the initial step of the method is the accurate measuring on-site of the width of the back wall of the enclosure, the vertical deviation of the corners 38, the width of each side wall of the enclosure, and the variations of the level of the top of the bathtub 12. Furthermore, measurements are also taken to locate and size apertures for fixtures such as taps and spouts as well as windows and other obstructions as is well known. All the measurements recorded are then reported off-site to the shop where the bathtub wall will be manufactured.

The measurements, which represent the three dimensional space of the bathtub wall enclosure area, are converted into the coordinates of a two dimensional coordinate system for mapping out onto the back of a flat sheet of laminate material. The coordinates detail the trimming points and vectors needed to completely cut and shape the entire bathtub wall covering to conform to the bathtub enclosure to be fitted. The conversion may be performed manually or with the aid of a computer programmed to calculate the conversion.

Once the measurements are converted, the coordinates may be manually mapped onto the laminate and the laminate cut with hand-held tools such as routers and drills. However, the coordinate system may be downloaded to a computer controlled router system such as model 53 of Thermwood Corporation, Dale, Ind. With the coordinates, the computer controlled router will completely trim the covering while in its flat state to its finished size, including cutting the required apertures. The router system may also mark the reference points required in order to shape the corners of the bathtub wall covering.

Once the laminate material is cut to size, the laminate material is positioned with aid of the reference marks on a bending machine. The bending machine heats the laminate and effects a cove bend of the laminate to produce a corner. The shaping process is repeated to create each corner required thus turning a flat laminate into a unitary bathtub wall having a back panel and at least one side panel. Laminate bending machines of the type suitable for the task are available from Edgetech Corporation, Bloomington, Minn.

The thus cut and shaped covering may be fitted with an edge moulding around its perimeter excepting the bathtub contacting bottom edge. The completely pre-finished bathtub wall covering is then ready for packaging and shipping to the measured bathtub enclosure area for installation.

Installation is easily performed by placing the covering in the enclosure area and marking on the walls of the enclosure the area covered by the covering. A slow setting mastic adhesive, such as Ultra-Grip 9000 available from Lepage, Brampton, Ontario, Canada for application with a squeeze gun, is spread over the marked area. A single mastic type adhesive is sufficient to bond laminates of the present invention due to their stiffness and reduced expansion characteristics the nature of which are linear.

After the adhesive is applied, the covering is replaced in the enclosure area and press fitted against the adhesive. The bottom edge of the covering may then be sealed to the top of the bathtub with a mildew-resistant silicone caulking as is well known.

It is intended that the foregoing description be regarded as illustrative rather than limiting, and that it is understood that it is the following claims, including all equivalents, which are intended to define the scope of this invention.

We claim:

1. A unitary formable high pressure plastic laminate material for post-forming a bathtub wall comprising a core within front and back layers of finishing resin wherein the total thickness of the laminate material is in the range of 0.025 to 0.1 inches.

2. The laminate material of claim 1 wherein the core comprises a plurality of phenolic resin impregnated layers of kraft paper.

3. The laminate material of claim 1 wherein the finishing resin layers comprise melamine.

4. A unitary formed laminated bathtub wall comprising a core within front and back layers of finishing resin, and wherein the wall comprises a back panel and at least one side panel wherein the total thickness of the wall is in the range of 0.025 to 0.1 inches.

5. A method of manufacturing a unitary laminated bathtub wall from a unitary formable high pressure plastic laminate for installation in a bathtub enclosure area, the method comprising the steps of:

measuring the bathtub enclosure area to obtain precise bathtub wall measurements;

cutting the laminate, which comprises a core within front and back layers of finishing resin, according to the measurements; and shaping the laminate according to the measurements to conform the laminated bathtub wall to the bathtub enclosure area;

wherein the cutting and shaping steps are conducted off-site from the bathtub enclosure area and wherein the shaping step is performed after the cutting step.

6. The method of claim 5 wherein the step of cutting includes the steps of:

converting the measurements into coordinates of a two dimensional coordinate system for mapping onto the laminate;

mapping the coordinates onto the laminate; and trimming the laminate to the dimensions defined by the coordinates.

7. The method of claim 6 wherein the step of converting includes the steps of:

entering the measurements into a computer system programmed to convert the measurements into coordinates of a two dimensional coordinate system; and operating the computer system.

8. The method of claim 6 wherein the step of mapping includes the steps of:

entering the coordinates into a computer-aided system capable of marking the laminate according to the coordinates; and operating the computer-aided system.

9. The method of claim 6 wherein the step of trimming includes the steps of entering the coordinates into a computer-aided system capable of trimming the laminate according to the coordinates; and operating the computer-aided system.

10. The method of claim 5 wherein the step of shaping includes the steps of:

converting the measurements into coordinates of a two dimensional coordinate system for mapping onto the laminate;

mapping the coordinates onto the laminate;

applying heat to the laminate at an area defined by the coordinates; and bending the laminate to form the laminated bathtub wall.

11. The method of claim 5 further including the step of fitting an edge moulding onto the laminated bathtub wall, and wherein the step of fitting is conducted off-site from the bathtub enclosure area.

12. The method of claim 5 further including the step of mounting the laminated bathtub wall to the bathtub wall enclosure area with a slow setting mastic adhesive.

13. The laminate material of claim 1, 2 or 3 wherein the total thickness of the laminate material is in the range of 0.040 to 0.060 inches.

14. The bathtub wall of claim 4 wherein the total thickness of the wall is in the range of 0.040 to 0.060 inches.

15. The laminate material of claim 1, 2 or 3 wherein the thickness of each finishing layer is in the range of 0.005 to 0.020 inches.

16. The bathtub wall of claim 4 or 14 wherein the total thickness of each finishing layer is in the range of 0.005 to 0.020 inches.

* * * * *